(12) United States Patent
Cooper et al.

(10) Patent No.: US 9,371,685 B2
(45) Date of Patent: Jun. 21, 2016

(54) METHOD AND APPARATUS FOR HANGING DOORS

(71) Applicant: GREIF PACKAGING LLC, Delaware, OH (US)

(72) Inventors: Scott M. Cooper, Massillon, OH (US); Raymond Shelton, Akron, OH (US)

(73) Assignee: Greif Packaging LLC, Delaware, OH (US)

( * ) Notice: Subject to any disclaimer, the term of this patent is extended or adjusted under 35 U.S.C. 154(b) by 0 days.

(21) Appl. No.: 14/458,743

(22) Filed: Aug. 13, 2014

(65) Prior Publication Data
US 2016/0046338 A1    Feb. 18, 2016

(51) Int. Cl.
*B65D 85/46* (2006.01)
*E06B 7/28* (2006.01)

(52) U.S. Cl.
CPC ........................................ *E06B 7/28* (2013.01)

(58) Field of Classification Search
CPC ......... B65D 65/026; B65D 65/06; E06B 7/28
USPC .................................... 49/380; 206/321, 325
See application file for complete search history.

(56) References Cited

U.S. PATENT DOCUMENTS

| | | | | |
|---|---|---|---|---|
| 3,361,280 A | * | 1/1968 | Traver | 414/627 |
| 4,089,424 A | * | 5/1978 | Steimann et al. | 212/166 |
| 4,884,938 A | * | 12/1989 | Fujita et al. | 414/541 |
| 4,961,257 A | * | 10/1990 | Sakamoto et al. | 29/823 |
| 5,415,516 A | * | 5/1995 | Richards | 414/458 |
| 2007/0289888 A1 | * | 12/2007 | Stangel | 206/430 |
| 2012/0213329 A1 | * | 8/2012 | Holum, Jr. | 378/38 |

FOREIGN PATENT DOCUMENTS

FR         3007330 A1 * 12/2014

* cited by examiner

*Primary Examiner* — Jerry Redman
(74) *Attorney, Agent, or Firm* — Sand & Sebolt

(57) ABSTRACT

A door mounting system for mounting a door includes a door mounting frame and a lifter mount. The door mounting frame is attachable to a door and is removable from that door. The lifter mount is attachable to a propulsion device such as a forklift. The lifter mount is attached to the door mounting frame so that the propulsion device provides a way to transport the door mounting frame and the door to a location where it is desired to install the door.

13 Claims, 10 Drawing Sheets

METHOD AND APPARATUS FOR HANGING DOORS

BACKGROUND OF THE INVENTION

1. Field of Invention

The current invention relates generally to apparatus, systems and methods for hanging doors. More particularly, the apparatus, systems and methods relate to hanging doors on trailers. Specifically, the apparatus, systems and methods provide for a movable framing device useful in hanging doors on trailers.

2. Description of Related Art

Hanging doors can be clumsy, difficult and awkward. This is because doors are often large in size and a bit larger than the average person installing a door. Thus, it is awkward for a person to physically manipulate the door into position while at the same time connecting the door to a frame. Often the door will be recessed into a frame when in a closed position. It can be difficult to install the door in the closed position while recessed in the frame and at the same time physically connecting the door to the frame. Alternatively, it is awkward to try and connect the door to a frame while the door is in an open position. This is because the door is now movable in a 3-dimensional space so that it must be controlled in the three dimensional space while at the same time attempting to physically connect the door to its frame. Further, some doors can be large and quite heavy. For example, tractor trailer doors can be large and made out of metal so that they are heavy and awkward to manipulate.

SUMMARY

One aspect of an embodiment of the invention may include a door mounting system for mounting a door. The door mounting system includes a door mounting frame and a lifter mount. The door mounting frame is attachable to a door and is removable from that door. The lifter mount is attachable to a propulsion device such as a forklift. The lifter mount is attached to the door mounting frame so that the propulsion device provides a way to transport the door mounting frame and the door to a location where it is desired to install the door.

In one aspect the invention may provide for a method of mounting a door. The method begins by attaching a door mounting frame to a door. The door mounting frame can be similar to the one discussed below. The door mounting frame is then picked up by a forklift and moved into position by, at least in part, driving a forklift to a location to where the door will be hung. The door is then hung to an object while the door is attached to the door mounting frame. Once the door is mounted to the object, the door mounting frame is removed from the door.

BRIEF DESCRIPTION OF SEVERAL VIEWS OF THE DRAWINGS

One or more preferred embodiments that illustrate the best mode(s) are set forth in the drawings and in the following description. The appended claims particularly and distinctly point out and set forth the invention.

The accompanying drawings, which are incorporated in and constitute a part of the specification, illustrate various example methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION

Figure 1:
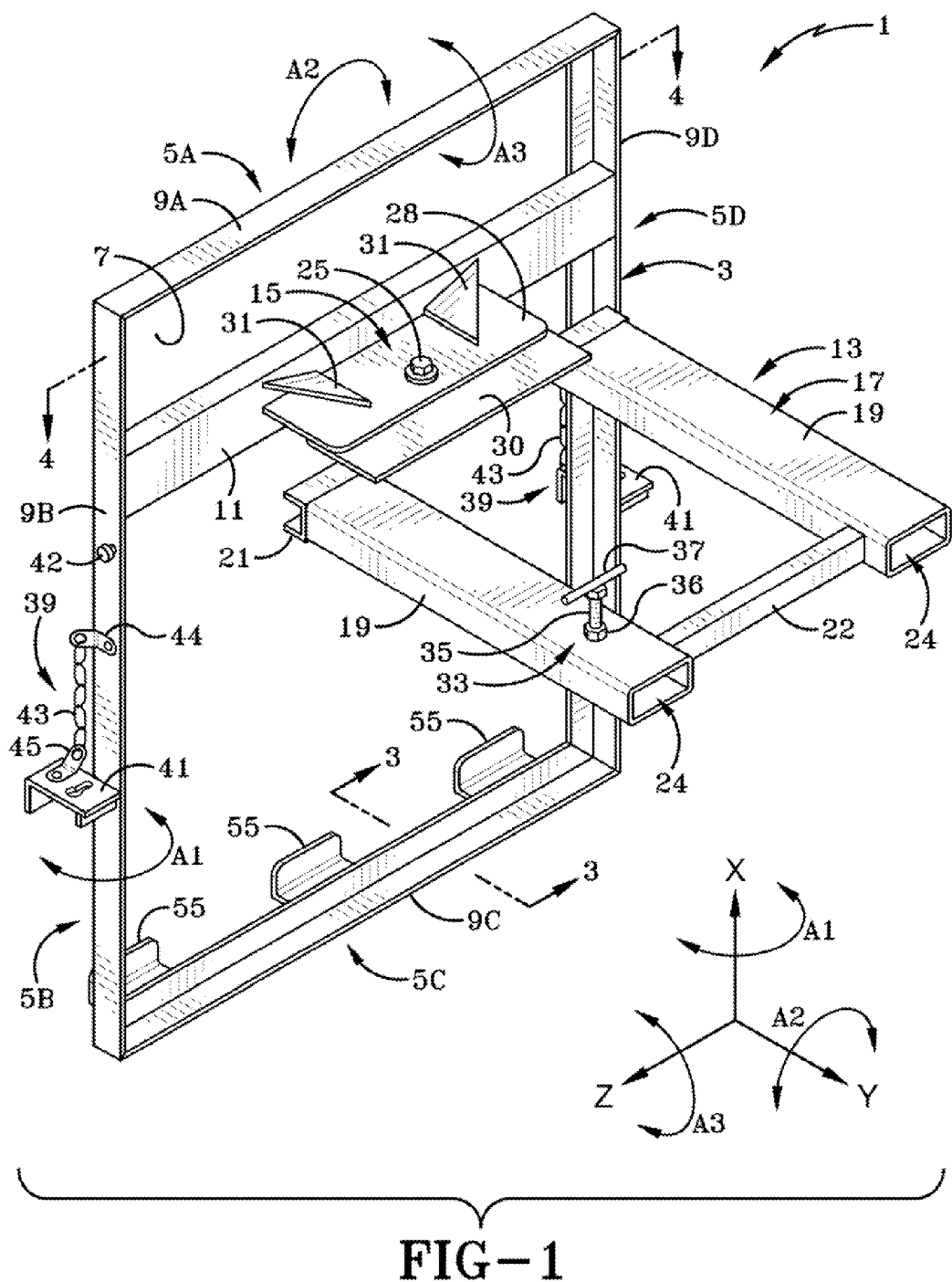
FIG. 1 illustrates a perspective view of a preferred embodiment of a system for mounting a door.

FIG. 1 illustrates the preferred embodiment of a door mounting system 1. The preferred embodiment will be described with respect to a rectangular shaped door mounting frame 3 for mounting trailer doors but in other embodiments it could be any shape for mounting any shape of door or for mounting doors other than trailer doors. The door mounting frame 3 includes a top end 5A, a left end 5B, a bottom end 5C and a right end 5D. The door mounting frame 3 is rectangular in shape with an opening 7. The door mounting frame 3 is formed with a top beam 9A, a left beam 9B, a bottom beam 9C and a right beam 9D. In the preferred embodiment, the beams 9A-D are formed out of angle iron and connected (e.g., welded) at their corners, but in other embodiments they could be any suitable ridged material.

An upper central cross-member 11 is rigidly attached to the left beam 9B and the right beam 9D. In the preferred embodiment the upper central cross-member 11 is a metal C-channel that is welded between the left beam 9B and the right beam 9D but it can be other ridged materials and can be attached to the left beam 9B and the right beam 9D in other ways. The upper central cross-member 11 is located approximately a quarter of the way below the upper end 5A and about three quarters of the way above the bottom end 5C. Of course, it can be located in other positions preferably more than half way above the bottom end 5C.

A pivotal positioning device 13 is connected to the cross-member 11. The pivotal positioning device 13 includes a pivot assembly 15 and a lifter mount 17. As discussed further below, the pivot assembly 15 allows the door mounting frame 3 and the lifter mount 13 to at least partially move in the x-direction, the y-direction and the z-direction as indicated by arrows A1-A3 (FIG. 1). The lifter mount 17 includes two lift beams 19, a front cross-member 21 and a rear cross-member 22. In the preferred embodiment, the lift beams 19 are elongated rectangular shaped pieces of metal with openings 24 extending their length. Ideally, the openings 24 are of a size so that a lifting tooth of a forklift can fit inside each opening 24. The lift beams 19 are connected together by the front cross-member 21 and the rear cross-member 22 that are welded between them. The cross-members 21, 22 are C-shaped pieces of metal.

Figure 4:
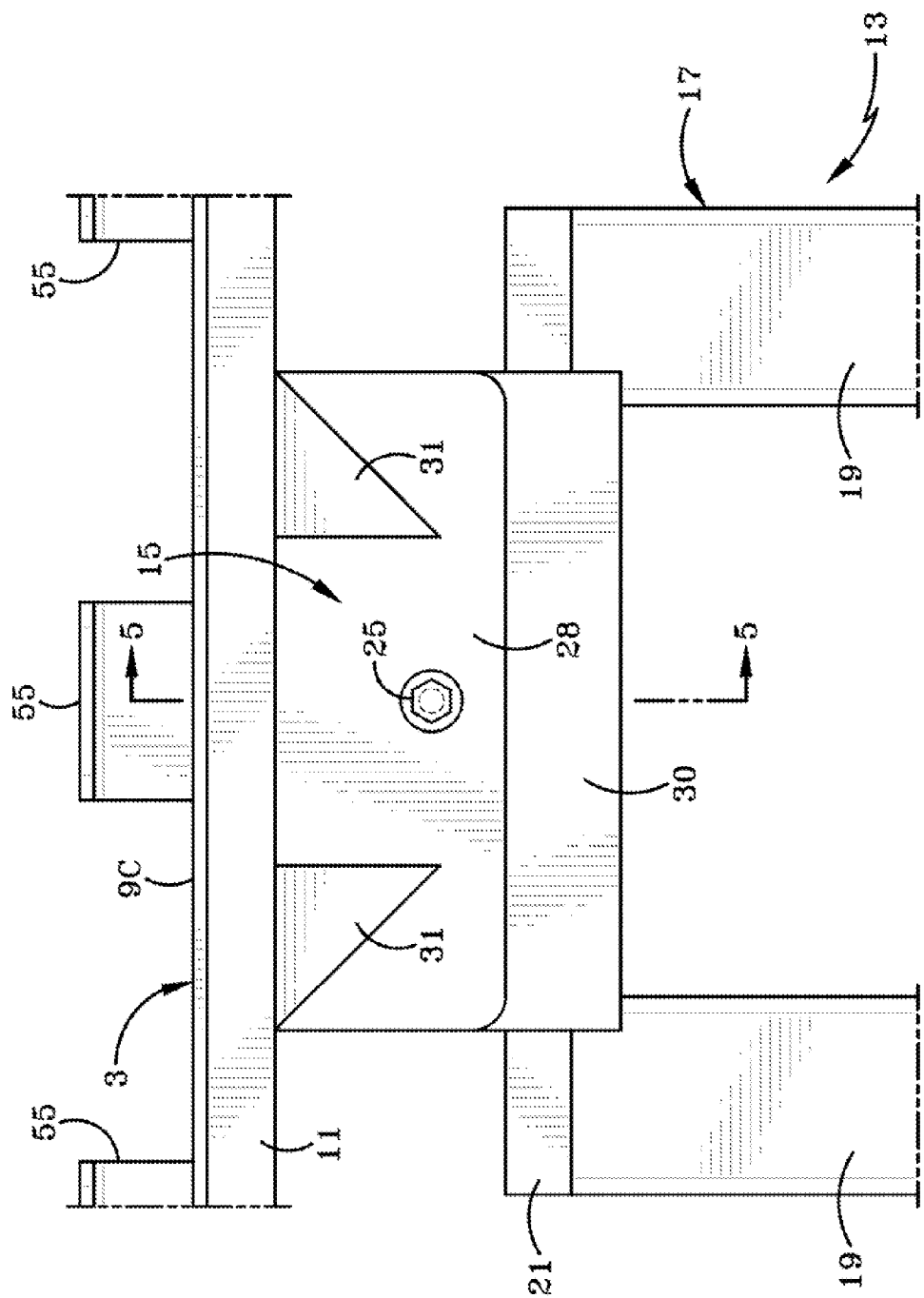
FIG. 4 illustrates an example top view of the pivot assembly of the system for mounting a door.
Figure 5:
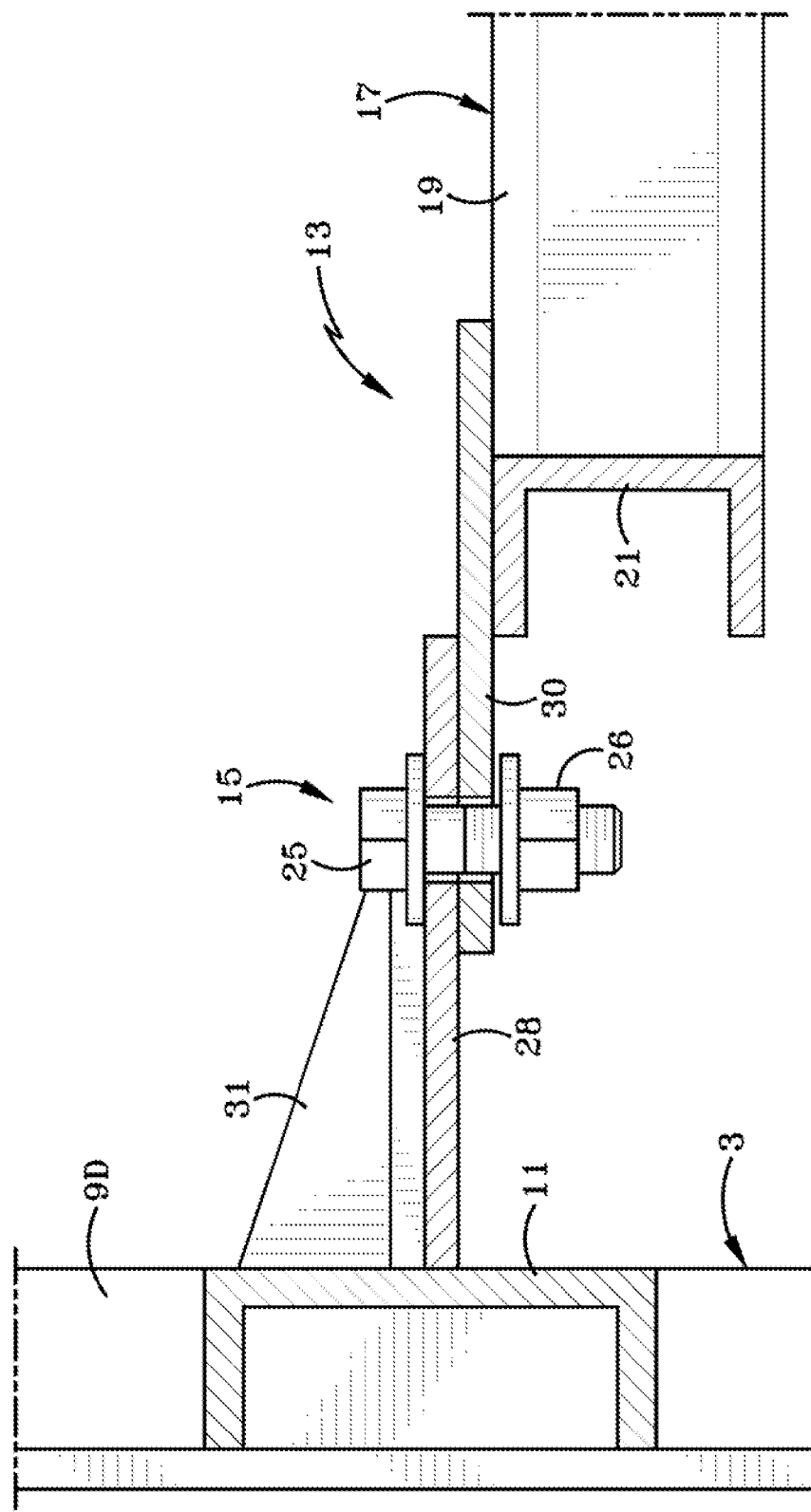
FIG. 5 is a cross section view taken along line 5-5 in FIG. 4 and illustrates an example cross-sectional view of the pivot assembly of the system for mounting a door.

In the preferred embodiment, the pivot assembly 15 includes a bolt 25 and a nut 26, as best seen in FIGS. 4 and 5. This bolt 25 passes through a pivot attachment plate 28 that is attached to the cross-beam 11 and a rotation limiting plate 30 that is attached to the front cross-member 21. Each of these plates are flat pieces of steel welded to the cross-beam 11 and a rotation limiting plate 30 welded to the front cross-member 21, respectively. Additional gussets 31 are welded to the cross-beam 11 and the front cross-member 21 for additional strength. As understood by those of ordinary skill in the art, the pivot assembly 15 be any device that allows for this type of pivotal movement. For example, it can also be a universal joint or it can be formed with pivotal rotating shafts and/or hinges and/or other devices.

The lifter mount 17 further includes (as best seen in FIG. 1) a retaining device 33. The retaining device 33 includes a bolt 35, a nut 36 and a handle 37. In the preferred embodiment, the nut 36 is welded onto one of the lift beams 19. The bolt 35 is at least partially threaded through the nut 36 into the lift beam 19. The handle 37 is, in the preferred embodiment, a cylindrical rod welded to the top end of the bolt 35. As discussed below the bolt is screwed into the lift beam 19 when a forklift or other device is inserted into the lift beams 19 to lift a door mounted in the door mounting frame 3 to ensure the door mounting system 1 does not separate from the forklift. Those of ordinary skill in this art will appreciate that other locking mechanisms and other components could be used to lock the door mounting mechanism 1 to the forklift or other devices used to manipulate the door mounting mechanism 1 and all of these locking mechanisms are included in other embodiments of this invention.

Figure 2:
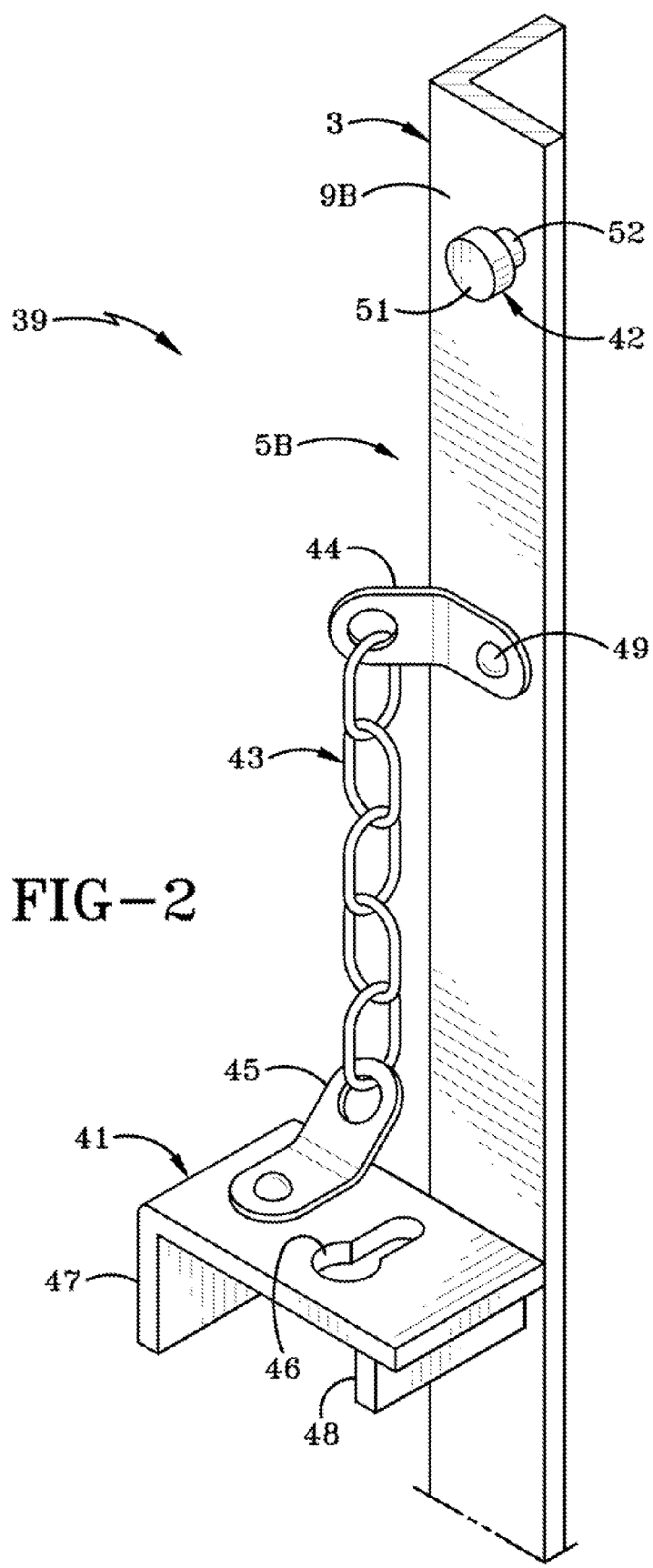
FIG. 2 illustrates an example lock mechanism used to secure a door to the system for mounting a door.

The door mounting frame 3 further includes lock mechanisms 39 on the left beam 9B and the right beam 9D of the door mounting frame 3, as best seen in FIG. 2 that illustrates in detail the lock mechanism 39 attached to the right beam 9D. This lock mechanism 39 includes a lock bracket 41, a lock pin 42 and a chain 43. The lock pin 42 has a rounded top 51 that extends outward from a central shaft 52 that has a diameter smaller than the rounded top 51. The lock pin 42 is attached to the right beam 9D by attaching its central shaft to the right beam 9D. A first end of the chain 43 is attached to a first chain attachment device 44 with the first chain attachment device 44 attached to the right beam 9D with a screw 49. The second end of the chain 43 is attached to a second chain attachment device 45 which is in turn is attached to the lock bracket 41. The lock bracket 41, in the preferred embodiment is formed out of a flat piece of metal and includes a pair of flanges parallel to each other. A lock flange 47 is larger and parallel to an alignment flange 48. As discussed below, the lock flange 47 is used to hold a door to the door mounting frame. A key hole opening 46 is cut into the lock bracket 41 as illustrated. A larger diameter opening of the key hole opening 46 allows the lock bracket to be slid onto the lock pin 42. The narrow portion of the key hole opening 46 allows the lock bracket 41 to be slid onto the narrow shaft 52 of the lock pin 42 to lock the lock bracket 41 to the lock pin 42.

Figure 3:
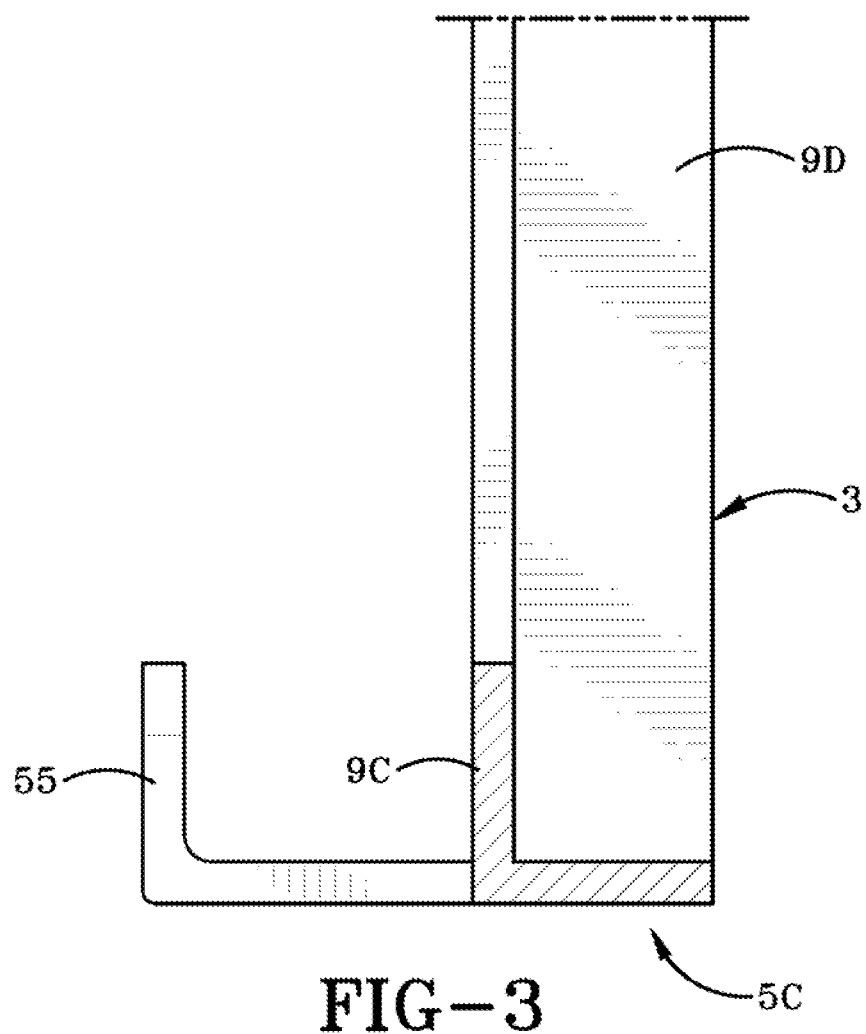
FIG. 3 is a cross section view taken along line 3-3 in FIG. 1 and illustrates example door support brackets used to secure a door to the system for mounting a door.

As best seen in FIG. 3, the door mounting frame further includes door support brackets 55. The door support brackets 55 protrude outward from the bottom beam 9C toward a front side of the door mounting frame 3 that is opposite the back side of the door mounting frame 3 that the pivotal positioning device 13 is mounted to. In the preferred embodiment, the door support brackets are formed out of angled metal, such as steel, and welded to the bottom beam 9C.

Figure 6:
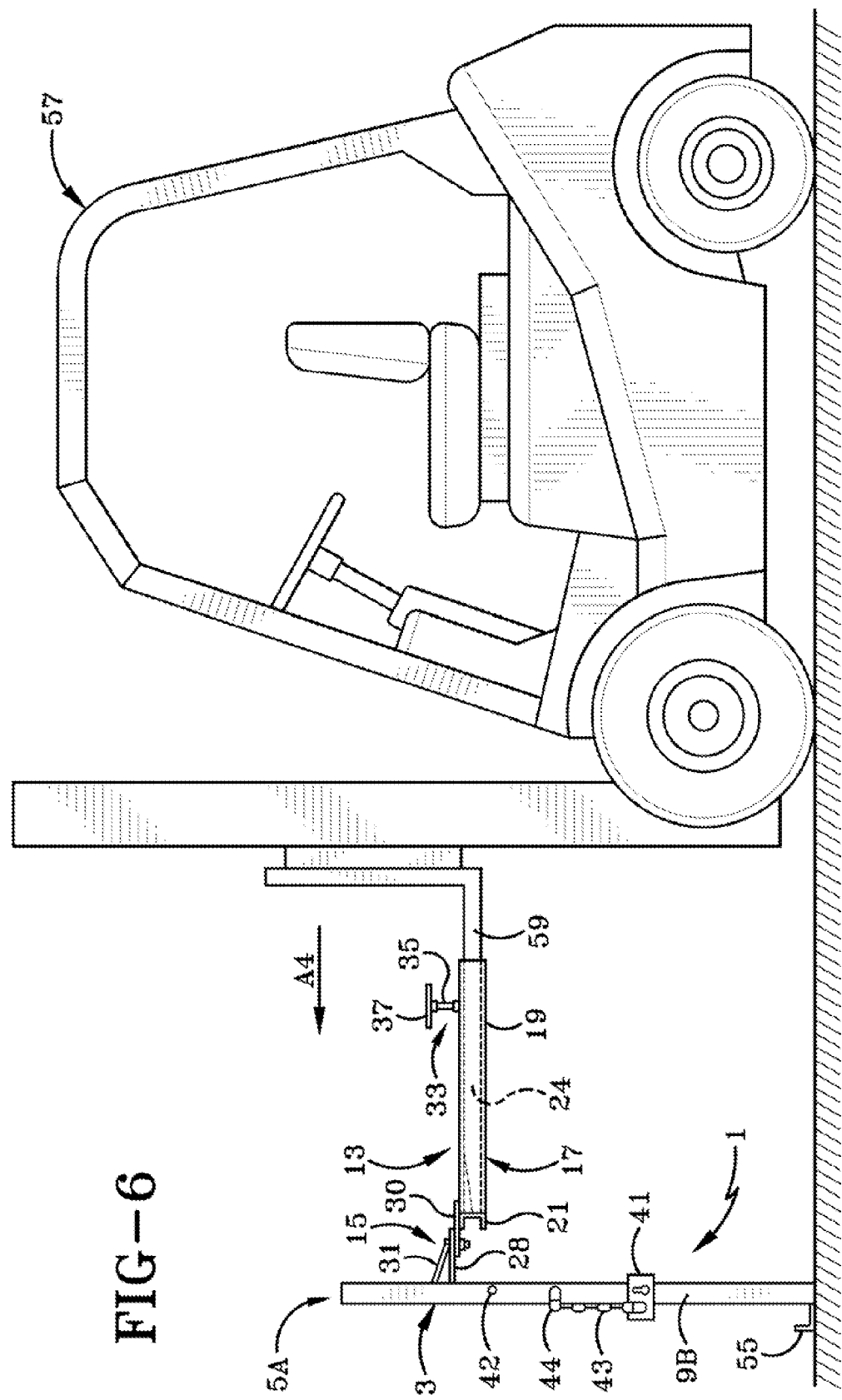
FIG. 6 illustrates an example view of the system for mounting a door attached to a forklift.

Having described the structure and components of the door mounting system 1, it use and operation will now be discussed. In one example use, a forklift 57 is brought to the door mounting frame 3 and lifting teeth 59 of the forklift are inserted into the openings of the lift beams in the direction of arrow A4 as seen in FIG. 6. Next, the retaining device 33 is tightened to the lifting teeth 59 by turning the handle 37 of the retaining device 33 to tighten its bolt down onto the lifting teeth 59 so that the door mounting frame cannot slide off of the lifting teeth 59.

Figure 7:
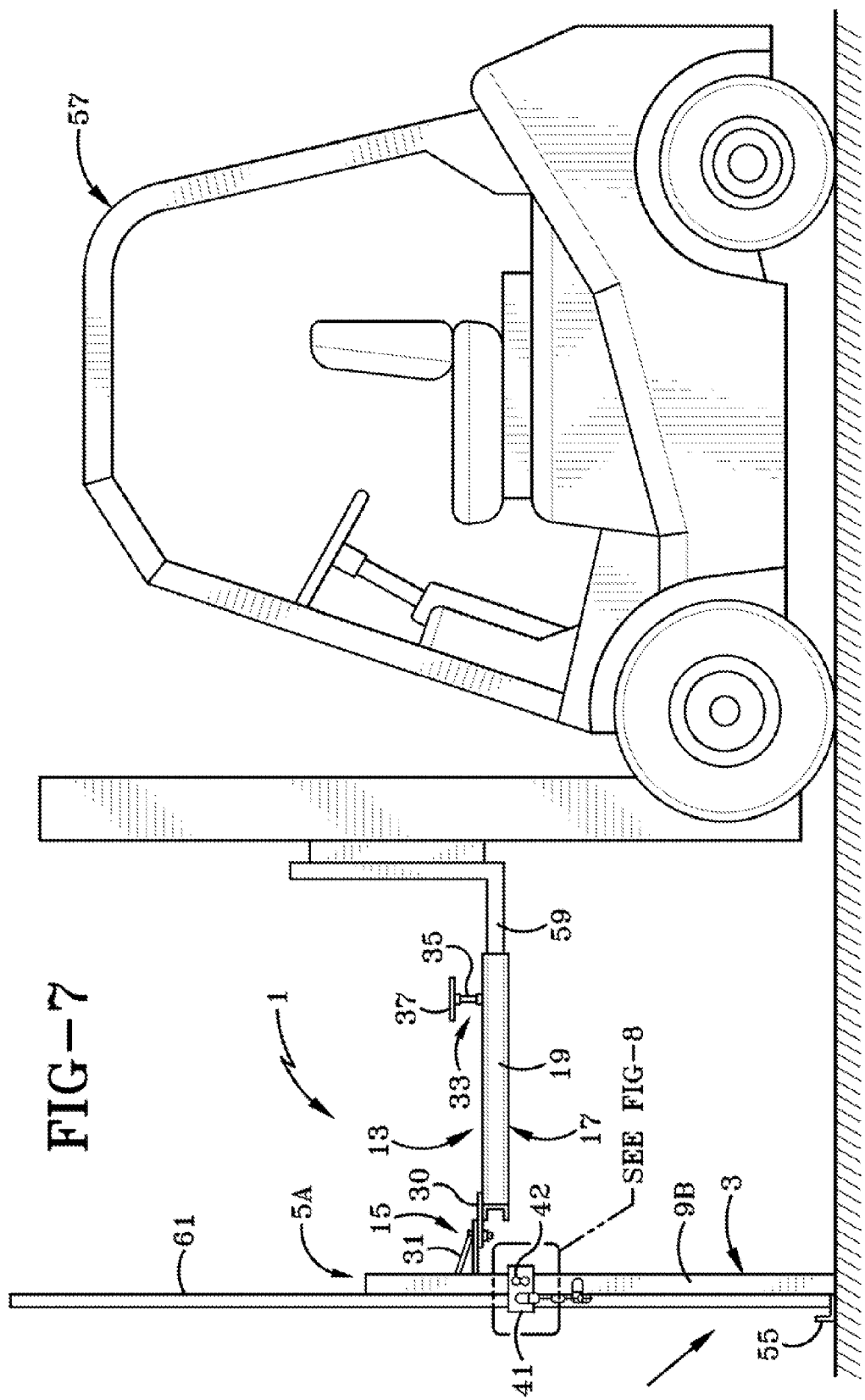
FIG. 7 illustrates an example view of the system for mounting a door attached to a forklift with a door mounted in the system for mounting the door.
Figure 8:
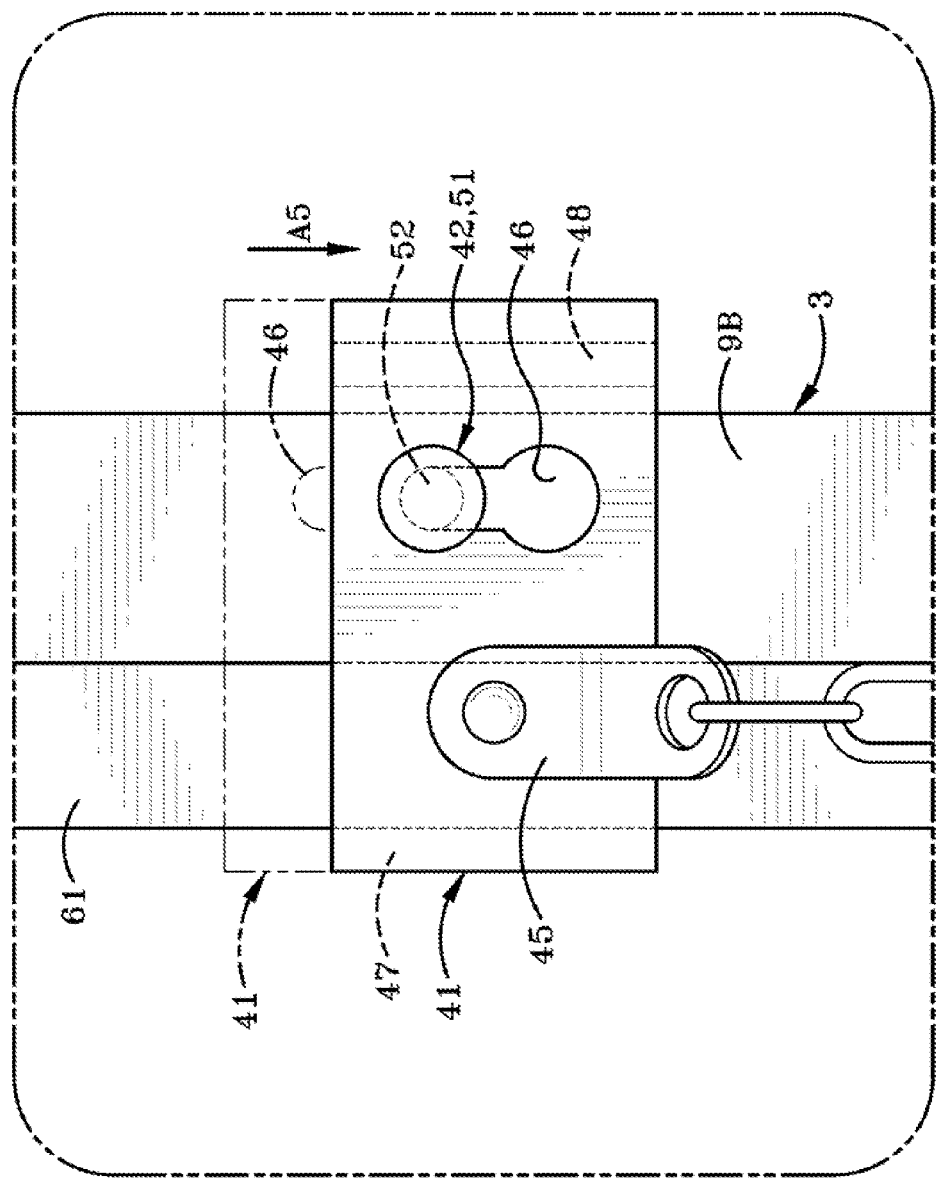
FIG. 8 illustrates how example door support brackets are used to secure a door to the system for mounting a door.

The forklift 57 is then driven to where a door is located and the door 61 is positioned onto the door support brackets 55 as best seen in FIG. 7. At the same time while the door is resting on the door support brackets 55, the lock mechanisms 39 are secured to the door 61 by pushing them downward in the direction of arrow A5 as seen in FIG. 8. This is accomplished by placing the lock flange 47 on a side of the door and placing the large opening of the key hole 46 over the lock pin 42. The lock bracket 41 is then pressed onto the beam it is attached to until the top 51 of the lock pin 42 extends out of the key hole 46. Now, the lock bracket 41 is moved in the direction of arrow A5 so that the narrow portion of the key hole 46 is positioned adjacent the narrow shaft 52 of the lock pin 42. Both the lock mechanisms 39 on the left beam 9B and the right beam 9D are attached to the door 61 to secure the door to the door mounting frame 3.

Figure 9:
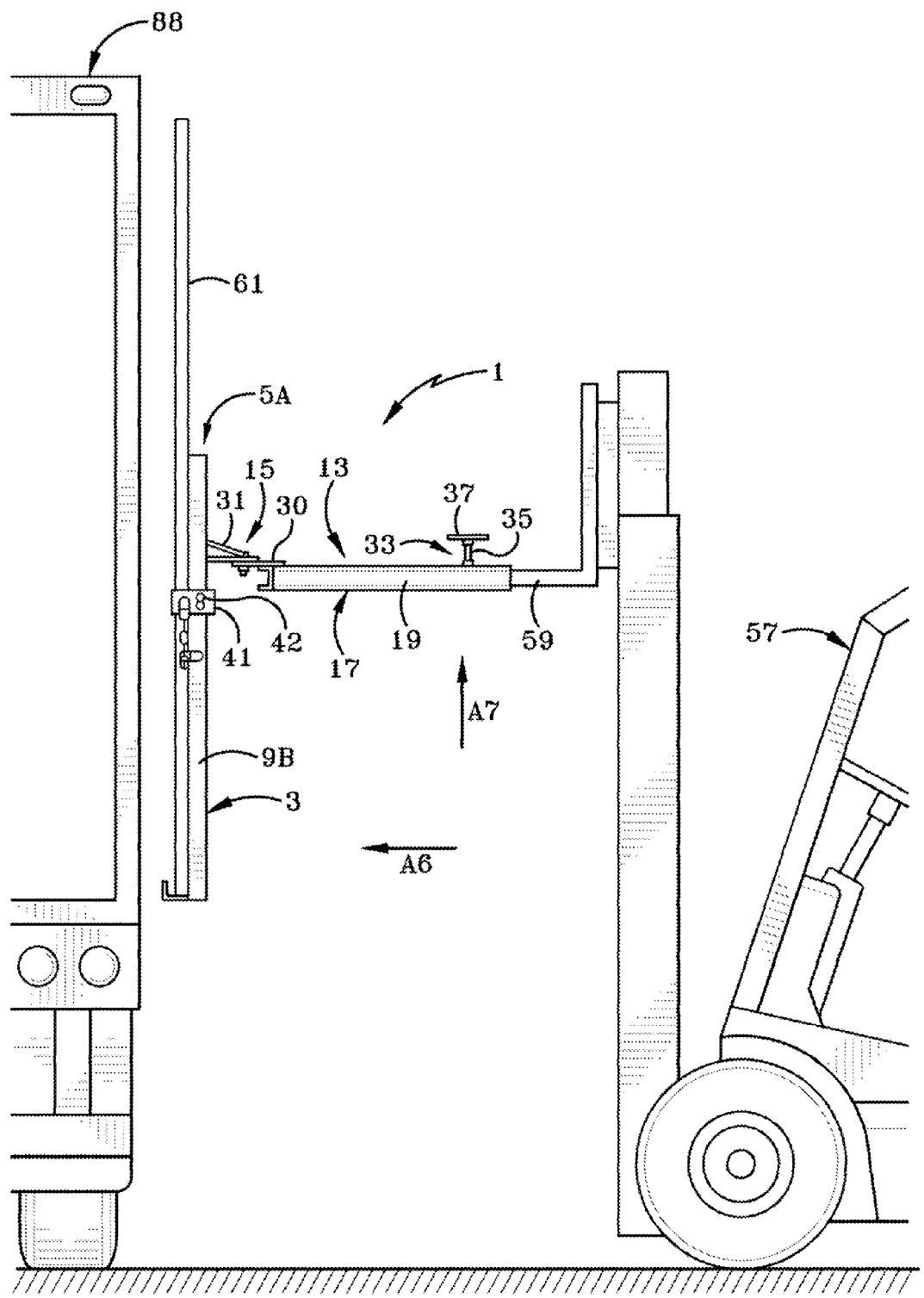
FIG. 9 illustrates an example view of the system for mounting a door attached to a forklift as the door is being positioned on a trailer.

Now the forklift 57 can transport the door 61 to a position where it is to be installed. For example, the door 61 can be a trailer door that is going to be mounted on a trailer 88. Once brought to a position to where the door 61 is to be mounted, the door 61 can be more finely positioned using the forklift 57 as well as the pivot assembly 15 of the door mounting frame 3 to manipulate the door 61 in the direction of arrows A6 and A7 (FIG. 9). As discussed above, the pivot assemble 15 allows the door mounting frame 3 and the door 61 to pivot in three dimensions. The rotation limiting plate 30 will prevent complete rotation of the door 61 but there is still enough rotation available to properly position the door 61 for initialization of the door 61. Once in position, the door 61 can be installed, for example, by attaching hinges to the door 61 and a frame of the trailer 88 it is to be attached to. Once installed, the lock mechanisms 38 are removed from the door and the forklift 57 can then move onto to its next task.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 10:
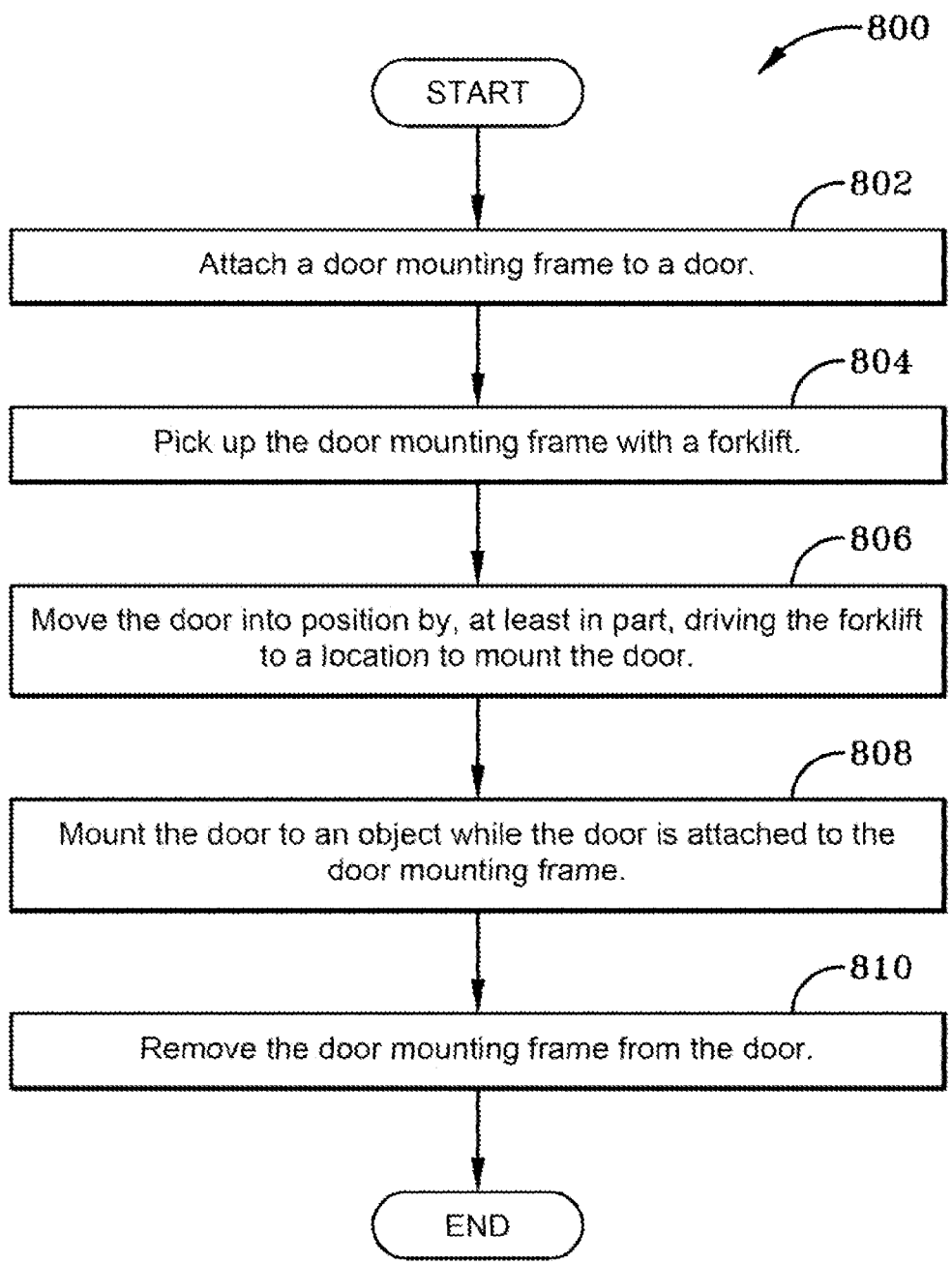
FIG. 10 illustrates a configuration of the preferred embodiment as a method of using a door mounting frame to mount a door on a trailer.

FIG. 10 illustrates a method 800 of method of mounting a door. The method 800 begins by attaching a door mounting frame to a door, at 802. The door mounting frame can be similar to the one discussed above. The door mounting frame is then picked up by a forklift, at 804, and move into position by, at least in part, driving the forklift to a location, at 806, to where the door will be hung. The door is then mounted to an object, at 808, while the door is attached to the door mounting frame. Once the door is mounted to the object, the door mounting frame is removed from the door, 810.

In the foregoing description, certain terms have been used for brevity, clearness, and understanding. No unnecessary limitations are to be implied therefrom beyond the requirement of the prior art because such terms are used for descriptive purposes and are intended to be broadly construed. Therefore, the invention is not limited to the specific details, the representative embodiments, and illustrative examples shown and described. Thus, this application is intended to embrace alterations, modifications, and variations that fall within the scope of the appended claims.

Moreover, the description and illustration of the invention is an example and the invention is not limited to the exact details shown or described. References to "the preferred embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in the preferred embodiment" does not necessarily refer to the same embodiment, though it may.

What is claimed is:

1. A door mounting system for mounting a door comprises:
   a door mounting frame adapted to be attached to a door;
   a lifter mount adapted to attach to a propulsion device, wherein the lifter mount is attached to the door mounting frame, wherein the propulsion device provides a way to transport the door mounting frame and the door to a location where the door is to be installed;
   locking mechanisms adapted to lock the door to the door mounting frame;
   wherein the locking mechanism further includes a lock bracket adapted to wrap around a side edge of the door;
   a lock pin attached to the door mounting frame, wherein the lock pin and the lock bracket are adapted to work together to lock the door to the door mounting frame; and
   a hole through which the lock pin passes when the door is locked to the door mounting frame, wherein the hole is further defined by a round open portion and a narrow portion that is smaller in width than a diameter of the round portion, wherein the lock pin can pass through the large round portion but not the narrow portion.

2. The door mounting system of claim 1 further comprising:
   a pivot assembly to allow the door mounting frame to at least pivot about a pivot point.

3. The door mounting system of claim 2 wherein the pivot assembly is connected between the door mounting fame and the lifter mount.

4. The door mounting system of claim 1 further comprising:
   a rotation limiting plate spaced from the two lift beams and adapted to limit at least some of the rotation of the door mounting frame.

5. The door mounting system of claim 1 wherein the door mounting frame is connected to the lift mount so that at least 30 percent of the door mounting frame is above the lift mount.

6. The door mounting system of claim 1 wherein the lift mount further comprises:
   openings that are adapted to receive lifting teeth of a forklift.

7. The door mounting system of claim 6 further comprising:
   a retaining device extending through one of the two lift beams adapted to the lock the lift mount to the lifting teeth of the forklift.

8. The door mounting system of claim 7 wherein the retaining device further comprises:
   a bolt with a handle attached to the bolt.

9. The door mounting system of claim 1 further comprising:
   door support brackets mounted under a bottom beam of the door mounting frame adapted to support the weight of the door.

10. The door mounting system of claim 1 wherein the door mounting frame further comprises:
    a top beam, a left beam, a bottom beam and a right beam.

11. The door mounting system of claim 10 wherein the door mounting frame further comprises:
    a cross-beam connected between the left beam and the right beam with the lifter mount is connected to a center of the cross-beam.

12. The door mounting system of claim 11 further comprising:
    an opening formed by the cross-member, the left beam, the bottom beam and the right beam.

13. The door mounting system of claim 10 wherein the top beam, the left beam, the bottom beam and the right beam are formed with angle iron.

\* \* \* \* \*